O. K. HARRY.
PULLEY.
APPLICATION FILED MAR. 18, 1907.
923,790.
Patented June 1, 1909.
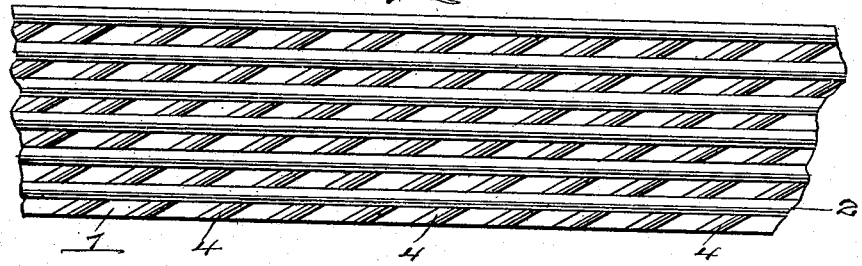
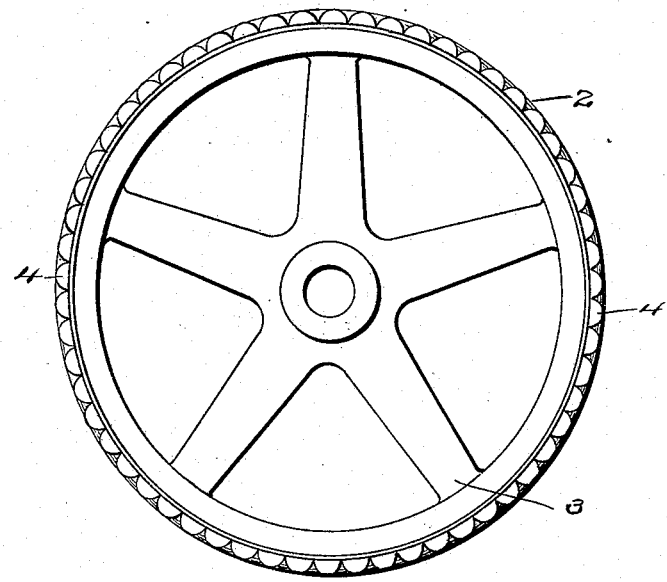
Witnesses
Inventor
Owen K. Harry
By Mason Fenwick Lawrence
Attorneys ns to the face 45
of a pulley adapted to produce indentations
in the semi-resilient surface of the belt,
which said indentations are occupied by the
means producing them while the said belt is
passing over the pulley, the said indentations 50
remaining in the belt or disappearing there-
from after passing the pulley, depending
upon the resiliency of the belt structure.

UNITED STATES PATENT OFFICE.

OWEN K. HARRY, OF ST. LOUIS, MISSOURI, ASSIGNOR TO O. K. HARRY STEEL CO., A CORPORATION OF MISSOURI.

PULLEY.

No. 923,790.     Specification of Letters Patent.     Patented June 1, 1909.

Application filed March 18, 1907. Serial No. 363,022.

*To all whom it may concern:*

Be it known that I, OWEN K. HARRY, a citizen of the United States, residing in the city of St. Louis and State of Missouri, have invented certain new and useful Improvements in Pulleys; and I do hereby declare the following to be a full, clear, and exact description of the invention, such as will enable others skilled in the art to which it appertains to make and use the same.

This invention relates to pulleys and other belt carrying wheels and surfaces, and has for an object to provide a belt engaging surface adapted for more intimate relation with the belt and to prevent slipping between the belt and pulley.

A further object of the invention is to provide a belt pulley having a surface provided with projections thereon adapted to produce and occupy indentations formed in the surface of the belt temporarily passing over the said pulley.

A further object of the invention is to provide a band adapted to be secured upon the outer surface of a belt pulley and provided with means for increased frictional engagement with the belt.

With these and other objects in view the invention comprises certain novel constructions, combinations and arrangements of parts, as will be hereinafter more fully described and claimed.

In the drawings:—Figure 1 is a plan view of the belt engaging means, and Fig. 2 is a side elevation of the pulley showing such means applied thereto.

Like characters of reference indicate corresponding parts throughout the several views.

It is well known that in the employment of belts running over and engaging smooth faced pulleys a considerable amount of slipping is occasioned, resulting in lost motion, lost power and irregularity of movement of the driven mechanism. The present invention comprehends means applied to the face of a pulley adapted to produce indentations in the semi-resilient surface of the belt, which said indentations are occupied by the means producing them while the said belt is passing over the pulley, the said indentations remaining in the belt or disappearing therefrom after passing the pulley, depending upon the resiliency of the belt structure.

In the drawings 1 indicates a band of any suitable material provided with corrugations 2 arranged longitudinally thereof, such corrugations extending circumferentially when the band is applied to the surface of the pulley 3, and with another series of corrugations 4 extending at an angle to the corrugations first mentioned. The corrugations 2 may be continuous and the corrugations 4 may be formed in the manner shown, but it is obvious that this exact arrangement is immaterial and that while the corrugations 4 are shown as extending at an angle of about 45° they may be arranged at any other angle.

The construction described constitutes an exceedingly efficient device for preventing the belt from slipping and for preventing undue wear. It permits a very large percentage of the power to be utilized in actual work.

What I claim is:—

The combination with a belt pulley, of a band of sheet material secured upon the periphery of the pulley and provided with corrugations extending circumferentially, and other corrugations extending at an angle to the first-mentioned corrugations.

In testimony whereof I affix my signature in presence of two witnesses.

OWEN K. HARRY.

Witnesses:
   GEO. H. PLOWMAN,
   MARCUS M. PLOWMAN.